United States Patent [19]
Maskery

[11] 3,939,416
[45] Feb. 17, 1976

[54] VEHICLE SPEED SIGNAL PULSE SOURCE

[75] Inventor: Arthur Maskery, Chippenham, England

[73] Assignee: Westinghouse Brake & Signal Co., Ltd., Chippenham, England

[22] Filed: July 15, 1974

[21] Appl. No.: 488,267

[52] U.S. Cl. ............................ 324/174; 324/34 D
[51] Int. Cl.² ........................................ G01P 3/48
[58] Field of Search ...... 324/173, 174, 34 D, 34 PS, 324/34 G; 340/196, 197, 263

[56] References Cited
UNITED STATES PATENTS

| | | | |
|---|---|---|---|
| 3,559,064 | 1/1971 | Grundy | 324/173 |
| 3,855,525 | 12/1974 | Bernin | 324/173 |

FOREIGN PATENTS OR APPLICATIONS

| | | | |
|---|---|---|---|
| 278,474 | 11/1970 | U.S.S.R. | 340/196 |

*Primary Examiner*—Robert J. Corcoran
*Attorney, Agent, or Firm*—J. B. Sotak; R. W. McIntire, Jr.

[57] ABSTRACT

This disclosure relates to a vehicle speed signal pulse generator employing a multi-limbed magnetic stator structure and a rotatable magnetic rotor. The multi-limbed magnetic structure includes a pair of magnetic core members about which are wound a primary and secondary winding. A permanent magnet is located in the multi-limbed magnetic structure to cause polarized magnetic flux to flow through each of the magnetic core members. A source of oscillating signals is connected to the input terminals of the primary winding to produce a.c. oscillations in the secondary winding when the vehicle is at rest. The magnetizable rotor includes a plurality of circumferential teeth disposed adjacent the magnetic stator structure to modulate the a.c. oscillations so that the modulated signals developed on the output terminals of the secondary winding will be indicative of the speed of the moving vehicle.

10 Claims, 1 Drawing Figure

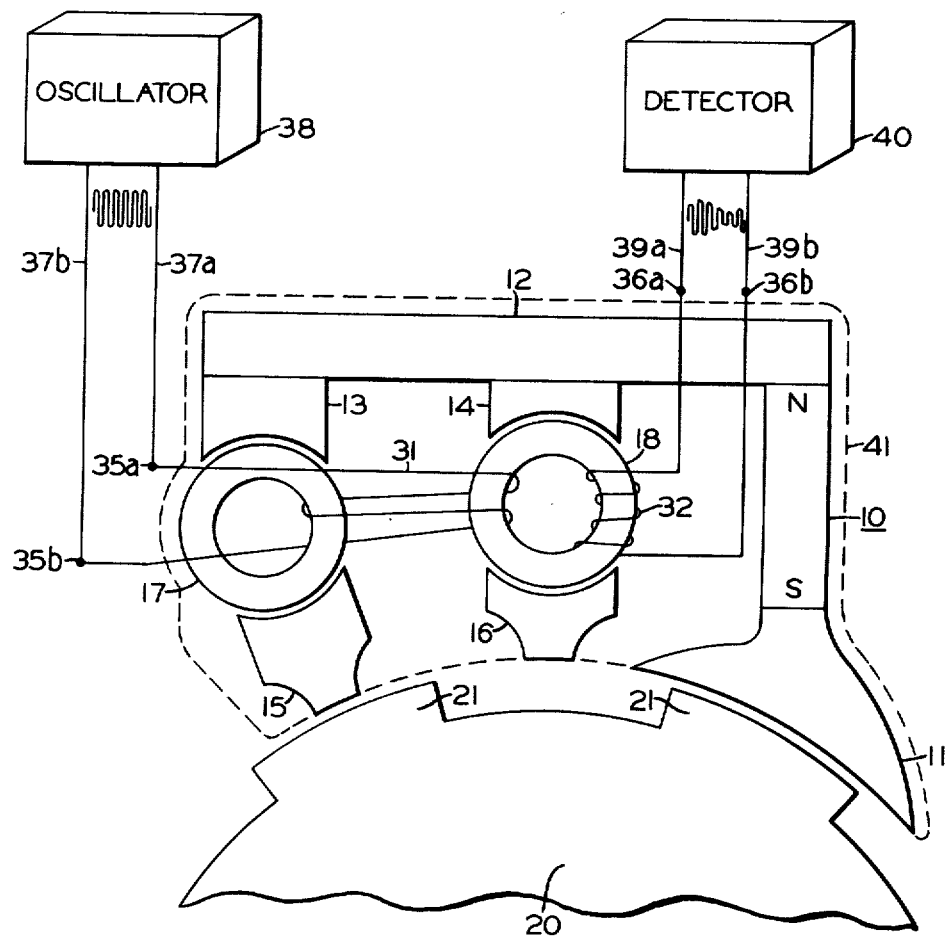

3,939,416

VEHICLE SPEED SIGNAL PULSE SOURCE

FIELD OF THE INVENTION

This invention relates to an improved vehicle speed signal pulse source and more particularly to a speed sensing device having a multi-limbed electromagnetic structure including a primary and a secondary winding wherein the primary winding is arranged to receive oscillating signals which are modulated by the rotation of a toothed wheel so that modulated signals proportional to the speed of the vehicle are induced into the secondary winding when the vehicle is moving and unmodulated signals are induced into the secondary winding when the vehicle is not in motion or when a failure occurs.

BACKGROUND OF THE INVENTION

In the past, various types of speed sensing devices, such as, electrical, electromagnetic and optical signal generators have been employed to measure the velocity of different ground vehicles, for example, automobiles, buses, transit cars and railroad trains. Generally, these previous types of signal generators included a rotor coupled to the vehicle axle which moved past a stator to produce signals which are directly proportional to the velocity or speed of the moving vehicle. It will be appreciated that while these conventional speed sensing devices have operated satisfactorily to varying degrees, there are certain aspects which must be carefully considered and effectively dealt with in order to maximize the velocity measuring operation. An acceptable speed measuring device must be capable of withstanding extreme shock and vibrations which are ever present in a roadway vehicular milieu. The violent and irregular agitation has a detrimental effect on any speed signal generator which utilizes frangible or unstable elements. Such previous apparatus is susceptible to breakage and misalignment of parts which either totally destroys or markedly reduces the signal generating ability of the speed sensing device. It is generally desirable to insure that a vehicle carried speed sensing generator includes inbuilt impedance matching and amplifying characteristics to minimize losses and to enhance the quality of the speed indicating signals. In addition, it is highly advantageous to provide a distinct type of positive signal when the vehicle is not moving or stopped and also when a failure has occurred in the speed sensing device.

OBJECTS OF THE INVENTION

Accordingly, it is an object of this invention to provide an improved vehicle speed signal generator for sensing the movement of vehicles.

Another object of this invention is to provide a unique signal pulse source having a multi-limbed electromagnetic stator structure and a toothed rotor for producing modulated signals which are indicative of the speed of a moving vehicle.

A further object of this invention is to provide a novel vehicle speed signal pulse source which is economical in cost, simple in construction, easy to install, reliable in operation and efficient and durable in use.

SUMMARY OF THE INVENTION

In accordance with the invention, there is provided a vehicle speed signal pulse source including a completed signal path between a pair of input terminals and a pair of output terminals. There are magnetic circuit elements having a primary winding for receiving oscillating signals at said input terminals to generate magnetic fluxes in each of the two magnetic elements and having a secondary winding connected to said output terminals. Each magnetic element forms a branch of a magnetic circuit which is polarized by a source of permanent magnetic flux. The magnetic circuit includes a magnetizable member which is movable to complete the magnetic circuit through one branch at a time at a rate dependent on the speed of the vehicle.

Each of the magnetic circuit elements may take the form of annular or ring core members. The primary winding may include one or more turns which may be wound about both of the annular cores. The secondary winding may include a plurality of turns which may be wound about a selected one of the annular cores.

The completion of the magnetic circuit through the branch including said one core member reduces the magnetic flux produced by the primary winding in the one core member and also the amount of flux linking the secondary winding. Conversely, the completion of the magnetic circuit through the branch including the other core member increases the magnetic flux produced by the primary winding in the one core and also the amount of flux linking with the secondary winding.

The magnetizable member may take the form of multi-toothed wheel or rotor which is driven by the axle of the vehicle. Thus, the teeth of the rotor move adjacent to the circumferentially spaced pole-pieces of each branch and a common pole-piece which form a part of the magnetic circuit. The pole-pieces of each branch may be spaced apart by an odd number of half-pitches of the teeth of the wheel while the common pole-piece may extend over a whole tooth-pitch.

A source of oscillations or oscillating signals may be connected to the input terminals and an amplitude detector may be connected to the output terminals. The detector is preferably responsive to the variations in amplitude or modulation envelope of oscillations passing along the completed path resulting from the movement of the rotor to indicate whether or not the vehicle is moving and also to determine the speed of movement of the vehicle. The percentage of the modulation is dependent upon the source of magnetic flux as well as the magnetic characteristic of the material of the circuit elements.

The source of magnetic flux may take the form of a permanent type of bar magnet.

If desired, there may be two electromagnetic structures or separate pulse sources connected to the axle of the vehicle which are mechanically displaced 90° apart from each other. Thus, the pulse signals developed across the output terminals will have a relative phase indicating the direction of movement of the vehicle.

The foregoing objects and other attendant features and advantages of this invention will become more fully apparent from the ensuing detailed description when considered in conjunction with the accompanying drawing therein.

DESCRIPTION OF THE DRAWINGS

The invention will now be described with reference to the accompanying drawing wherein the single FIGURE is a partial schematic and block diagram of a preferred embodiment of the magnetic structure and the electrical apparatus forming the vehicle speed signals pulse source.

DESCRIPTION OF THE PREFERRED EMBODIMENTS

As shown in the single FIGURE of the drawing, there is illustrated a substantially E-shaped magnetic circuit which includes a source of magnetic flux in the form of permanent bar magnet 10 which may be constructed of hardened steel or other magnetic material having a high magnetic retentivity characteristic. It will be noted that the south pole S of the permanent magnet 10 is provided with an arcuate soft-iron pole-piece 11 which is shaped to extend adjacent to a whole pitch of the teeth 21 of a toothed wheel or circular rotor 20. The rotor 20 is constructed of suitable magnetizable material, such as, silicon steel or soft-iron. As shown, the north pole N of the permanent magnet 10 is joined to one end of an elongated soft-iron backstrap member 12. It will be seen that transverse magnetic members or pieces 13 and 14 are located at the other end and at the intermediate portion, respectively, on the backstrap member 12. The free ends of members 13 and 14 are concaved or arcuately shaped to match outer peripheral surface of annular core members 17 and 18, respectively. Thus, the core members effectively convey the magnetic flux or lines of forces emanating from permanent magnet 10 to the respective annular or ring-like core members 17 and 18. These latter two individual branches of the magnetic circuit including annular or ring cores 17 and 18 are further provided with soft-iron pole-pieces 15 and 16, respectively which concentrate magnetic flux of the respective branches at the circumference of wheel or rotor 20. As shown, the upper ends of the pole-pieces 15 and 16 are concaved or arcuately shaped or match the outer peripheral surface of core members 17 and 18. The lower ends of the pole-pieces 15 and 16 are spaced apart an odd number of half-pitches of teeth 21, for example, one half-pitch as viewed in the drawing. It will be noted that both of the annular cores or magnetic rings 17 and 18 carry primary winding 31. As shown, a few turns, for example, two or three coils are wound around one limb or a portion of both of core members 17 and 18. It will be seen that the free ends of primary winding 31 are connected to input terminals 35a and 35b which in turn are connected to a suitable oscillator 38 via leads 37a and 37b. A secondary winding 32 is appropriately wound on another limb or portion core member 18. It will be appreciated that the secondary winding 32 has a larger number of turns to match a high-impedance load which is connected to output terminals 36a and 36b. As shown, the output terminals are connected by leads 39a and 39b to a suitable detector 40 the operation of which will be described hereinafter. It will be appreciated that the entire magnetic structure or circuit may be encapsulated in a suitable epoxy material or the like, depicted in phantom by numeral 41 to provide a stable and rigid mechanized stator assembly. It will be noted that the magnetizable toothed wheel or rotor 20 is disposed adjacent to and in close proximity to the stator structure. As mentioned above, the rotor 20 may be constructed of magnetizable material, such as, silicon steel or soft-iron and includes a plurality of evenly spaced teeth 21 located about the outer peripheral surface. The rotor 20 is suitably coupled through a gear train or the like to the axle of a wheel of the vehicle under surveillance. Thus, the movement of the vehicle on which the signal generator source is mounted produces discreet signals which are at a rate proportional to the speed of the vehicle. As mentioned above, input terminals 35a and 35b may be connected to a conventional oscillator 38, such as, a suitable oscillating signal generator having a frequency of 40KHz. The output terminals 36a and 36b may be connected to a suitable amplitude modulation type of detection circuit 40.

In describing the operation of the signal pulse generator source, it will be assumed that the generator has been properly mounted on the vehicle and that it is functioning properly. It will be appreciated that magnetic flux in a given branch of the magnetic circuit will be higher when its pole-piece is adjacent a tooth 21 of rotor 20 than when the respective pole-piece is adjacent to the gap between teeth 21 of rotor 20. With the connection of the 40KHz frequency signal to the input terminals 35a and 35b, an appropriate magnetic flux will be produced in each of annular cores 17 and 18. By suitably designing the annular cores and by properly choosing the impedance of the frequency source or oscillator 38 the total or maximum flux density can be maintained below the saturation level of each core so that fluctuations will occur on the linear part of the magnetization characteristic curve where the reluctance changes significantly with flux level.

Thus, when tooth 21 is situated adjacent either of pole-piece 15 or 16, a complete magnetic circuit extends through the respective branch which will cause the magnetic flux from permanent magnet 10 to increase the flux level in one of the annular cores 17 and 18. If it is assumed that core member 17 is the one in which the flux level is increased, the reluctance in this branch also increases. Hence, it will be appreciated that the amount of magnetic flux in the core 17 produced by the primary winding 31 proportionally decreases. As a result more magnetic flux is diverted into the annular core 18 to maintain the total flux of the primary winding constant. The increase of the magnetic flux in core 18 increases the output signal induced into secondary winding 32.

Conversely, when the annular core 18 is the one in which the flux level is increased by the completion of the magnetic circuit through that branch then the flux produced by the primary winding 31 in the core member 18 decreases while an appropriate increase occurs in core member 17. Hence, the decrease in the magnetic flux in annular core 18 reduces the output signal induced in the secondary winding 32.

Accordingly the effect of the alternate completion of the magnetic circuit through the two branches of the respective annular core members causes a modulation effect in the amplitude of the oscillations or oscillator signals that are transferred along the said signal path between input terminals 35a and 35b and output terminals 36a and 36b.

It will be appreciated that the percentage modulation is determined by the amount of magnetic flux provided by permanent magnet 10 which can be readily adjusted by setting the size of the air-gaps existing between pole faces 11, 15 and 16 of the stator and teeth 21 of the rotor. The transformer arrangement of magnetic core members 17 and 18 and the primary and secondary windings 31 and 32 can be designed to give the nominal output signal required in the absence of modulation.

It will be apparent that the rate of the modulation is proportional to the speed of the toothed wheel or rotor 20 and that this rate can be conveniently determined by the amplitude modulation detector 40. Thus, the detected signals may be used as speed indication for a vehicle speed control system in, for example, a railway train operation.

The present source provides several advantages over known speed signal pulse sources. Firstly, there is a distinct output signal even when the vehicle is stopped at rest. Since the pole-pieces 15 and 16 are a half-pitch apart, the output signals appearing on terminals 36a and 36b when the vehicle is at rest will always be between the maximum and minimum of the modulation. Secondly, the provision of two magnet core members ensures that the occurrence of a short-circuited turn in the primary or secondary winding will materially affect the output signal. It will be appreciated that the preferred arrangement would have a single turn primary winding linking both of the annular cores 17 and 18. A shorted primary or secondary turn will then reduce the output below the lower or minimum modulation percentage. The preferred arrangement can be considered as an inductor in series with the primary of a current transformer wound on one core so that neither can operate properly in the event of a failure of the other. Thirdly, the regulation of the secondary output voltage is good.

In the preferred embodiment, the frequency of the input oscillations from oscillator 38 is selected at 40KHz and the minimum and maximum output modulation levels are chosen at 50% and 100%, respectively.

If it is necessary to sense the direction of movement of the vehicle, it is possible to employ two sources of output oscillations having phase angles displaced 90° apart to determine the direction of rotation of rotor 20. Thus, two magnetic circuits can be mounted near one wheel and spaced, say, 90° apart so that the phase relationship of the outputs will indicate direction of rotation.

It will be appreciated that various changes and modifications may be made to the presently described speed signal pulse generator without departing from the spirit and scope of the subject invention. For example, the core members 17 and 18 may take the form of square, rectangular, oval or the like configuration rather than annular or ring members. The frequency of the input signals produced by oscillator 38 may obviously be varied and the pitch and number of teeth of rotor 20 may increase or decrease dependent the needs and the desired characteristics which are necessary to obtain optimum operation. Other changes, alterations and modifications may be made in practicing the present invention. Thus, it will be appreciated that the showing and description of the present invention should be taken in an illustrative and diagrammatic sense only.

Having now described the invention, what I claim as new and desire to secure by Letters Patent, is:

1. A vehicle speed signal pulse source comprising, input and output terminals, a substantially E-shaped magnetic structure wherein two legs of the E form a pair of magnetic circuit branches, a common primary winding wound about both of said pair of magnetic circuit branches and connected to said input terminals, a second winding wound about one of said pair of magnetic circuit branches and connected to said output terminals, a signal connected to said input terminals to produce magnetic fluxes in both of said pair of magnetic circuit branches, the last leg of the E including a permanent magnet forming another magnetic circuit branching of said substantially E shaped magnetic structure and causing magnetic flux to pass through both of said pair of magnetic circuit branches, and a rotatable magnetizable member positioned adjacent the legs of the E for increasing the reluctance in one of said pair of magnetic circuit branches at a time at a rate dependent upon the speed of rotation of said magnetizable member.

2. A vehicle speed signal pulse source as defined in claim 1, wherein each of said pair of magnetic circuit branches includes an annular core member.

3. A vehicle speed signal pulse source as defined in claim 2, wherein said common primary winding is wound about both of said annular core members.

4. A vehicle speed signal pulse source as defined in claim 2, wherein said secondary winding is wound about one of said annular core members.

5. A vehicle speed signal pulse source as defined in claim 4, wherein the increase in the reluctance in said one of said annular core members reduces the magnetic flux produced by said primary winding in said one annular core member and decreases the amount of magnetic flux linking said secondary winding.

6. A vehicle speed signal pulse source as defined in claim 4, wherein the increase in the reluctance of said other of said annular core members increases the magnetic flux produced by said primary winding in said one annular core member and increases the amount of magnetic flux linking said secondary winding.

7. A vehicle speed signal pulse source as defined in claim 4, wherein said magnetizable member is a tooth wheel rotor which is disposed adjacent to circumferentially spaced pole-pieces cooperatively associated with each of said pair of magnetic circuit branches and a common pole-piece cooperatively associated with said permanent magnet.

8. A vehicle speed signal pulse source as defined in claim 7, wherein said pole-pieces of each of said pair of magnetic circuit branches are spaced apart by an odd multiple of one-half to the tooth pitch of said rotor.

9. A vehicle speed signal pulse source as defined in claim 7, wherein said common pole-piece is arranged to extend over a whole tooth pitch.

10. A vehicle speed signal pulse source as defined in claim 1, wherein signals induced in said secondary winding and appearing across said output terminals are amplitude modulated to determine the speed of movement of a vehicle as well as the lack of movement of the vehicle.

* * * * *